Feb. 1, 1955 E. J. WHALEN 2,700,987
PRESSURE CONTROLLED CONDENSATION DRAIN TRAP
Filed March 7, 1952 2 Sheets-Sheet 1
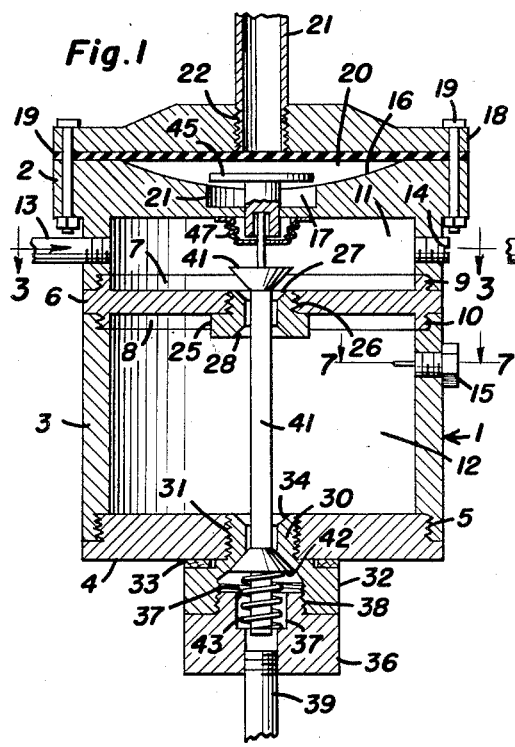
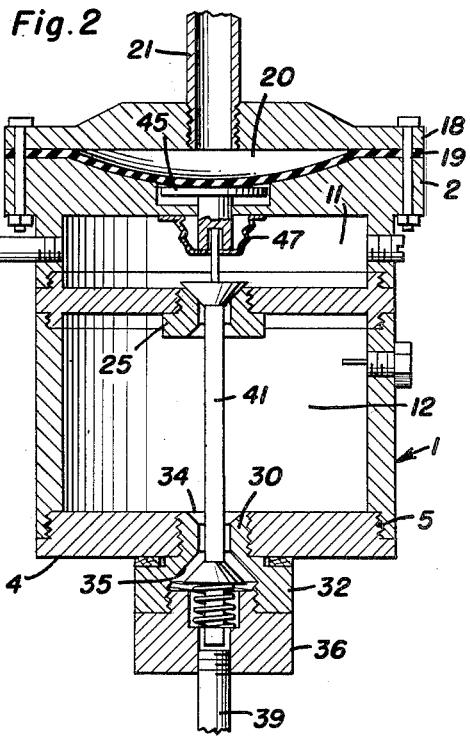
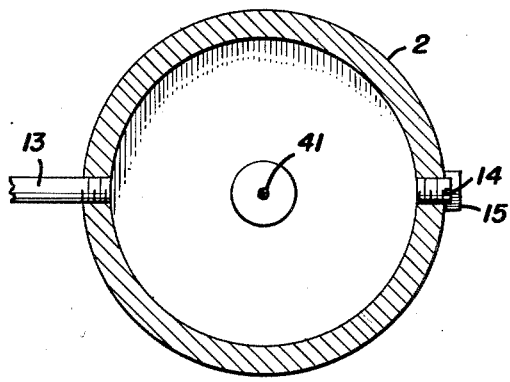
Edward J. Whalen
INVENTOR.
BY *Clarence A. O'Brien*
*and Harvey B. Jacobson*
Attorneys Feb. 1, 1955 E. J. WHALEN 2,700,987
PRESSURE CONTROLLED CONDENSATION DRAIN TRAP
Filed March 7, 1952 2 Sheets-Sheet 2

Edward J. Whalen
INVENTOR.

BY *Clarence A. O'Brien*
and *Harvey B. Jacobson*
Attorneys

United States Patent Office 2,700,987
Patented Feb. 1, 1955

2,700,987

PRESSURE CONTROLLED CONDENSATION DRAIN TRAP

Edward J. Whalen, Centerdale, R. I.

Application March 7, 1952, Serial No. 275,407

2 Claims. (Cl. 137—784)

My invention relates to improvements in pressure controlled traps for draining condensation and dirt from air lines, or air chambers, of humidifying installation, especially, though not necessarily, where air is in continuous use from a source intermittently controlled.

The primary object of my invention is to provide an efficient drain trap for the purpose specified embodying an improved arrangement of oppositely seating diaphragm and spring operated valves for opening and closing primary and secondary condensation collecting chambers in a valve housing.

Another object is to provide a trap of the above indicated type in which the valves for the primary and secondary collecting chambers seat downwardly and upwardly, respectively under control of air pressure against the diaphragm.

Another object is to provide in such a valve for seating of the valves for the primary and secondary collecting chambers upwardly and downwardly, respectively, as an alternative modified embodiment of the trap.

Still another object of the invention is to provide in such a trap for use of the same valve seats in either arrangement of the valves.

Still another object is to provide a trap for the purposes specified which is easy to take apart and clean and comparatively inexpensive to manufacture.

Other and subordinate objects, together with the precise nature and advantages of my improvements will be readily understood when the succeeding description and claims are read with reference to the drawings accompanying and forming a part of this specification.

In said drawings:

Figure 1 is a view in vertical section of a trap constructed in accordance with my invention, in the preferred embodiment thereof, the moving part of the trap being shown in normal position;

Figure 2 is a similar view illustrating the operation of the moving parts by the diaphragm;

Figure 3 is a view in horizontal transverse section taken on the line 3—3 of Figure 1;

Figure 4:
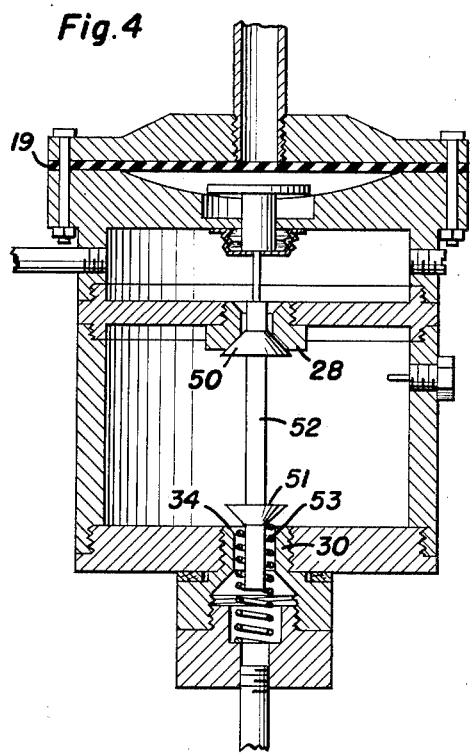
Figure 4 is a view in vertical section of the alternative modified embodiment of the trap with the parts in normal position.

Referring now to the drawings by numerals, and first to Figures 1 to 3 and 6 and 7, in the preferred embodiment thereof my improved trap comprises a cylindrical closed valve housing 1 including an annular top head section 2 of inverted cup-shape, a bottom section 3 closed at the bottom of the housing 1 by an annular bottom plate 4, threaded as at 5, into the same, and an intermediate annular partitioning section 6 having reduced top and bottom annular flanges 7, 8 threaded into the top head section 2, as at 9, and into the top of the bottom section 3, as at 10, to connect said sections 2, 3 together and form in said housing 1 a transverse partition dividing said housing into upper and lower primary and secondary condensation collecting chambers 11, 12, respectively, the chamber 12 being preferably larger than the chamber 11.

An inlet pipe 13 for the primary condensation collecting chamber 11 is tapped into one side of the head section 2, and a vacuum relief plug 14 in the other side of head section, as a safety measure. A vacuum relief valve 15 for the lower chamber 12 may be provided in the bottom section 3.

The head section 2 is formed with an annular concave recess 16 and countersink 17 and includes an annular cap plate 18 bolted as at 19, thereto and clamping a flexible diaphragm 19 over the recess 16 to form in said head section together with the recess 16 and countersink 17 and air pressure chamber 20. An air pressure inlet pipe 21 is threaded, as at 22, into the top plate 18 for introducing air under pressure to said diaphragm 19.

A condensation drain nipple 25, forming a valve seat insert, is threaded axially, as at 26, upwardly into the partition section 6 and to communicate the primary collection chamber 11 with the secondary collecting chamber 12 and is provided with bevelled valve seats 27, 28 in the upper and lower ends thereof.

A second condensation drain nipple 30, also forming a valve seat insert, is threaded upwardly, as at 31, into the bottom plate 4 axially thereof with a depending annnular skirt 32 seated against a gasket 33. The nipple 30 is provided with bevelled valve seats 34, 35 in the upper and lower ends thereof and an annular plug 36, recessed as at 37, is threaded part way, as at 38, into the annular skirt 32 to couple a condensation discharge pipe 35 to said skirt 32, and for another purpose presently apparent.

A valve stem 41 is vertically movable in opposite directions in the nipples 28, 30, with a slight clearance for drainage flow and is provided with an upper bevelled valve member 41 adaptable to seat downwardly in the valve seat 27 in the upper end of the nipple 28, and with a like lower but reversed valve member 42 adapted to seat upwardly in the valve seat 35 in the lower end of the nipple 30. A coil spring 43 surrounds the valve stem 41, and is positioned beneath the valve member 42 and seated in the recess 37 and urges the valve stem 41 upwardly to normally seat the valve member 42 upwardly in the valve seat 35 and unseat the valve member 41 upwardly relative to the valve seat 37 whereby the lower nipple 30 is closed, the upper nipple 36 is opened and the primary condensation chamber 11 is normally in communication with the secondary condensation chamber 12.

A T-shaped follower 45 has an axially bored stem 46 slidably fitted in an axial opening 17' in the bottom of the recess 17 for vertical movement of its head 45' into and out of the recess 16 and countersink 17, and with its stem loosely fitted over the upper end of the valve stem 41 and seated thereon for operation by downward flexings of the diaphragm 19 to move the valve stem 41 downwardly in opposition to the coil spring 43. The head 45' is normally spaced below the diaphragm 19 to reduce resistance to initial flexing of the diaphragm 19 downwardly and so that said diaphragm will engage the head 46 with a sudden impact to drive the valve stem 41 downwardly. The countersink 17 provides for relieving back pressure against downward flexing of the diaphragm 19. The loose fit of the stem 46 on the valve stem 41 provides for easy assembly and disassembly of these parts.

A bellows-type sealing member 47 is suitably fixed to and depends from the end section 2 into the pressure chamber 11 in surrounding relation to the lower end of the follower 45 and the upper end of the valve stem 41 and forms a seal around said follower presenting back pressure from said collecting chamber 11 from seeping into said pressure chamber 20.

Referring now to the operation of the described preferred embodiment of my invention, with the inlet pipe 13 connected to an air line, or air pressure tank, of the installation (not shown), to be drained of condensation, and the air pressure inlet pipe 21 connected in any suitable manner, for instance, to the unloading valves of an air compressor of the installation which runs intermittently, as is usual, air from the compressor is supplied intermittently to the air pressure chamber 20 against the diaphragm 19 to flex the diaphragm downwardly in said pressure chamber 20. When no pressure is thus supplied, the coil spring 43 maintains, in a manner which is clear, the valve member 42 seated and the nipple 30 closed while the valve member 41 is unseated and the nipple 28 open, as shown in Figure 1. This allows condensation from the inlet pipe 13 to enter the primary collecting chamber 11 and pass through the nipple 28 into the secondary collecting chamber 12 to collect temporarily therein. When air pressure is supplied against the diaphragm 19, the follower 45 is moved downwardly by said diaphragm to move the valve stem 41 downwardly. This seats the valve member 41 in the seat 27 in a closing position relative to the nipple 25 and unseats the valve member 42 so as to open the nipple 30 so that condensation from the pipe 13 is pumped into primary collecting chamber and that collected in the secondary collecting chamber 12 is permitted to discharge through the nipple 30 and the discharge pipe 39. As the valve members 41, 42 move from opening to closing positions, the air pressure temporarily trapped in said chambers 11, 12 forces the condensation out of said chamber. The vacuum relief valve 15 is of conventional construction and is for the purpose of automatically relieving a vacuum in the secondary collecting chamber 12 caused by rush of air out of said chamber. The plug 14 may be removed for similarly relieving a vacuum in the primary collecting chamber 11 occurring from a similar cause.

Figure 5:
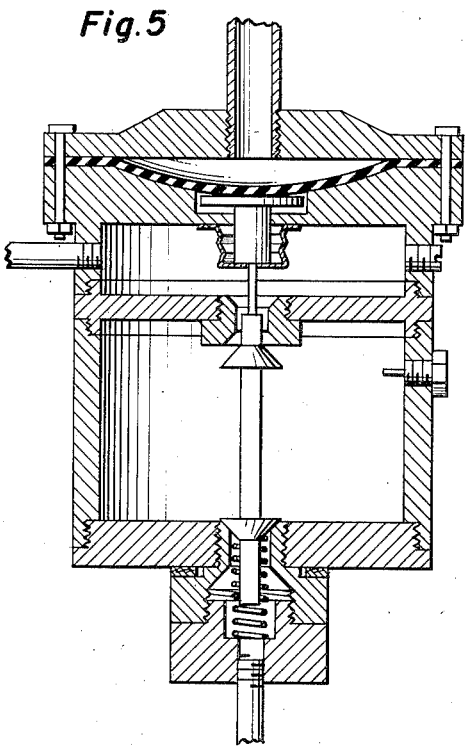
Figure 5 is a similar view of the same illustrating the operation of the moving parts by the diaphragm.
Figure 6:
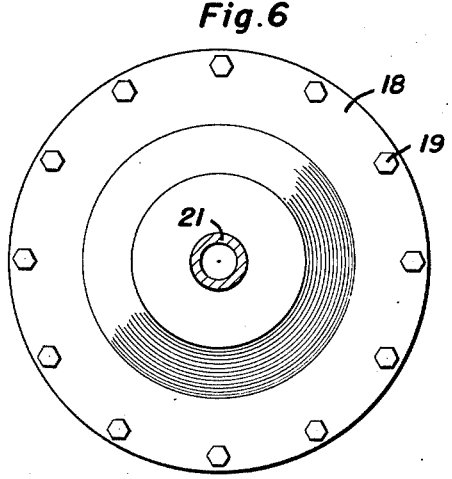
Figure 6 is a view in plan.
Figure 7:
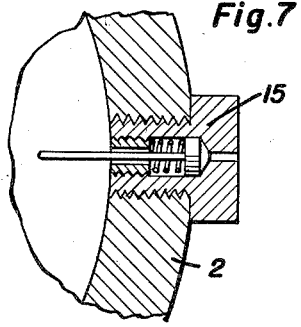
Figure 7 is a fragmentary enlarged view in horizontal section taken on line 7—7 of Figure 1.

In the modified alternative embodiment of the invention, shown in Figures 4 and 5, the construction and arrangement is the same as in the preferred embodiment except that the valve members 50, 51 are provided on the valve stem 52 in reverse position relative to the arrangement in the preferred embodiment. The valve stem 52 is normally moved upwardly by a coil spring 53 corresponding to the coil spring 43, to seat valve member 50 upwardly in the seat 28 in the lower end of the nipple 25 and to unseat the valve member 51 upwardly relative to the valve seat 34 in the upper end of the nipple 30. Downward flexing of the diaphragm 19 unseats the valve member 50 downwardly and seats the valve member 34 in opposition to the spring 53. Otherwise then as described, the operation in this embodiment of the invention is the same as in the preferred embodiment.

The foregoing will, it is believed, suffice to impart a clear understanding of my invention, without further explanation. Manifestly, the invention, as described, is susceptible to modifications, without departing from the inventive concept, and right is herein reserved to such modifications as fall within the scope of the appended claims.

Having described the invention, what is claimed as new is:

1. Operating means, for a spring tensioned valve stem in a condensation collecting chamber comprising a pressure chamber surmounting said condensation chamber and having a concave bottom with a central countersink therein, an air pressure inlet in the top of said pressure chamber, a diaphragm in said pressure chamber flexible downwardly under pressure against the same, and a follower in said pressure chamber beneath said diaphragm slidably extending through the bottom of the pressure chamber and seated on said stem, said follower being movable downwardly into said countersink by downward flexing of said diaphragm to operate said stem, said follower having a bored stem slidably engaged with said valve stem, and a head engageable by said diaphragm and fitting in said countersink.

2. Operating means for a spring tensioned valve stem in a condensation collecting chamber comprising a pressure chamber surmounting said condensation chamber and having a concave bottom with a central countersink therein, an air pressure inlet in the top of said pressure chamber, a diaphragm in said pressure chamber flexible downwardly under pressure against the same, and a follower in said pressure chamber beneath said diaphragm slidably extending through the bottom of the pressure chamber and seated on said stem, said follower being movable downwardly into said countersink by downward flexing of said diaphragm to operate said stem, said follower having a bored stem slidably engaged with said valve stem, and a sealing bellows depending from said bottom around said valve stem and under said bored stem.

References Cited in the file of this patent
UNITED STATES PATENTS

| Number | Name | Date |
|---|---|---|
| 578,873 | Hermansader et al. | Mar. 16, 1897 |
| 2,241,056 | Chilton | May 6, 1941 |
| 2,316,052 | Dach | Apr. 6, 1943 |
| 2,494,434 | Farmer | Jan. 10, 1950 |
| 2,496,215 | Jones | Jan. 31, 1950 |
| 2,509,597 | Hamilton | May 30, 1950 |
| 2,548,236 | Parks | Apr. 10, 1951 |
| 2,585,045 | Schmidlin | Feb. 12, 1952 |
| 2,598,361 | Dach | May 27, 1952 |